United States Patent
Rosenberger et al.

(10) Patent No.: US 11,940,648 B2
(45) Date of Patent: Mar. 26, 2024

(54) METHODS FOR PRODUCING A HOLLOW-CORE FIBER AND FOR PRODUCING A PREFORM FOR A HOLLOW-CORE FIBER

(71) Applicant: HERAEUS QUARZGLAS GMBH & CO. KG, Hanau (DE)

(72) Inventors: Manuel Rosenberger, Hanau (DE); Michael Hünermann, Hanau (DE); Martin Trommer, Hanau (DE); Kay Schuster, Hanau (DE); Steffen Weimann, Hanau (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 264 days.

(21) Appl. No.: 17/623,783

(22) PCT Filed: Jul. 15, 2020

(86) PCT No.: PCT/EP2020/069994
§ 371 (c)(1),
(2) Date: Dec. 29, 2021

(87) PCT Pub. No.: WO2021/009222
PCT Pub. Date: Jan. 21, 2021

(65) Prior Publication Data
US 2022/0244453 A1    Aug. 4, 2022

(30) Foreign Application Priority Data

Jul. 17, 2019 (EP) .................... 19186753

(51) Int. Cl.
*G02B 6/032* (2006.01)
*C03B 37/012* (2006.01)
*C03B 37/027* (2006.01)

(52) U.S. Cl.
CPC .......... *G02B 6/032* (2013.01); *C03B 37/0122* (2013.01); *C03B 37/01245* (2013.01);
(Continued)

(58) Field of Classification Search
CPC ............... G02B 6/032; C03B 37/0122; C03B 37/01245; C03B 37/02781; C03B 2203/16; C03B 2203/42
See application file for complete search history.

(56) References Cited

U.S. PATENT DOCUMENTS

2003/0172682 A1  9/2003  Sato et al.
2003/0230118 A1  12/2003  Dawes et al.
(Continued)

FOREIGN PATENT DOCUMENTS

CN    109143460 A    1/2019
CN    109932778 A    6/2019
(Continued)

OTHER PUBLICATIONS

International Search Report and Written Opinion dated Sep. 14, 2020 by the European Patent Office in its capacity as International Searching Authority for counterpart international patent application No. PCT/EP2020/069994 (with English translations attached).
(Continued)

*Primary Examiner* — Tina M Wong
(74) *Attorney, Agent, or Firm* — Panitch Schwarze Belisario & Nadel LLP

(57) ABSTRACT

Methods are known for producing an anti-resonant hollow-core fiber which has a hollow core extending along a fiber longitudinal axis and an inner jacket region that surrounds the hollow core, said jacket region comprising multiple anti-resonant elements. The known methods have the steps of: providing a cladding tube that has a cladding tube inner
(Continued)

Figure 1:
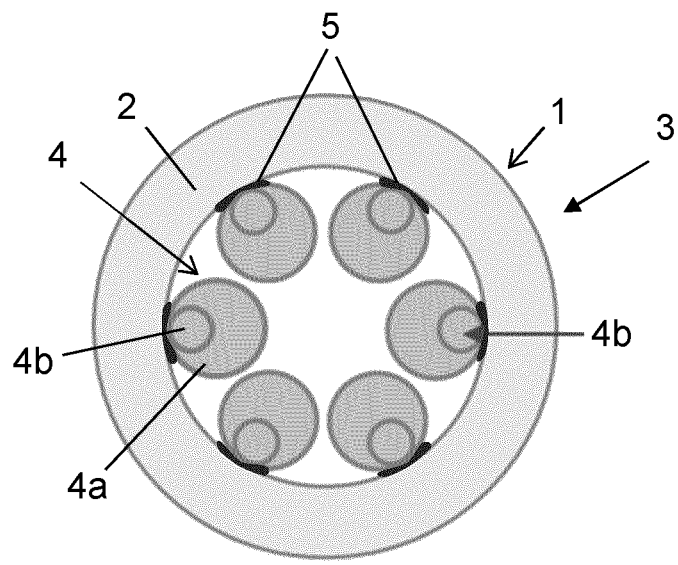

bore and a cladding tube longitudinal axis along which a cladding tube wall extends that is delimited by an interior and an exterior; providing a number of tubular anti-resonant element preforms; arranging the anti-resonant element preforms at target positions of the interior of the cladding tube wall, thereby forming a primary preform which has a hollow core region and an inner jacket region; further processing the primary preform in order to form a secondary preform, including an elongation process; and drawing the secondary preform in order to form the hollow-core fiber. The aim of the invention is to achieve a high degree of precision and an exact positioning of the anti-resonant elements in a sufficiently stable and reproducible manner on the basis of the aforementioned methods. This is achieved in that after the primary preform is elongated, at least some of the formerly tubular anti-resonant element preforms of the primary preform have an oval outer cross-sectional shape with a longest cross-sectional axis $A_L$ and a shortest cross-sectional axis $A_K$, wherein the ratio $A_L/A_K$ of the length of the axes ranges from 1.01 to 1.27, and the shortest cross-sectional axis $A_K$ runs in a radial direction when viewed from the cladding tube longitudinal axis.

15 Claims, 2 Drawing Sheets

(52) U.S. Cl.
CPC .... *C03B 37/02781* (2013.01); *C03B 2203/16* (2013.01); *C03B 2203/42* (2013.01)

(56) References Cited

U.S. PATENT DOCUMENTS

| | | | |
|---|---|---|---|
| 2004/0096173 | A1 | 5/2004 | Fekety et al. |
| 2005/0226578 | A1 | 10/2005 | Mangan et al. |
| 2006/0046075 | A1 | 3/2006 | Maul et al. |
| 2006/0130528 | A1 | 6/2006 | Nelson et al. |
| 2008/0310806 | A1 | 12/2008 | Mukasa |
| 2009/0019893 | A1 | 1/2009 | Bogdahn |
| 2017/0160467 | A1 | 6/2017 | Poletti et al. |
| 2020/0079680 | A1* | 3/2020 | Corrado ................. G02B 6/032 |

FOREIGN PATENT DOCUMENTS

| | | |
|---|---|---|
| DE | 102004054392 A1 | 3/2006 |
| DE | 102005028219 B3 | 10/2006 |
| DE | 102014011041 A1 | 1/2016 |
| EP | 3136143 A1 | 3/2017 |
| EP | 3199991 A1 | 8/2017 |
| GB | 2566466 A | 3/2019 |
| WO | 02/072489 A2 | 9/2002 |
| WO | 2018/169487 A1 | 9/2018 |
| WO | 2019/008352 A1 | 1/2019 |

OTHER PUBLICATIONS

Jasion, Gregory T. et al., "Fabrication of tubular anti-resonant hollow core fibers: modelling, draw dynamics and process optimization" Optics Express vol. 27, No. 15, pp. 20567-20582, Jul. 2019 (DOI: 10.1364/OE.27.020567).
Kosolapov, A.F. et al., "Hollow-core revolver fibre with a double-capillary reflective cladding" Quantum Electronics 46 (3) Mar. 29, 2016 pp. 267-270 (DOI: 10.1070/QEL15972).
Nawazuddin, M.B.S. et al., "Lotus Shaped Negative Curvature Hollow Core Fibre with 10.5 dB/km at 1550 nm Wavelength" 2017 European Conference on Optical Communication (ECOC), IEEE, (2017) pp. 1-3 (DOI: 10.1109/ ECOC.2017.8346101).
Poletti, Francesco "Nested antiresonant nodeless hollow core fiber," Optics Express, vol. 22, No. 20 (2014) pp. 23807-23828 (DOI:10.1364/OE 22.023807).
Sherlock, Ben et al., "Tunable fibre-coupled multiphoton microscopy with a negative curvature fibre" Journal of Biophotonics, vol. 9, No. 7, pp. 715-720, (2016) (DOI: 10.1002/jbio.201500290).
Yu, Fei, "Chapter 4—Fabrication of hollow core negative curvature fibre" IN "Hollow core negative curvature fibres" University of Bath PhD. pp. 59-74, Dec. 31, 2013 (XP055656461).
Partial English Summary of Office Action dated Mar. 25, 2023 in CN Application No. 202080042645.5.

* cited by examiner

METHODS FOR PRODUCING A HOLLOW-CORE FIBER AND FOR PRODUCING A PREFORM FOR A HOLLOW-CORE FIBER

TECHNICAL BACKGROUND

The invention relates to a method for producing an anti-resonant hollow-core fiber comprising a hollow core extending along a longitudinal axis of the fiber and a sheath region surrounding the hollow core, which sheath region comprises a number of anti-resonance elements, comprising the method steps of:
- (a) providing a cladding tube comprising an inner bore of the cladding tube and a longitudinal axis of the cladding tube, along which a cladding tube wall delimited by an inner side and an outer side extends,
- (b) providing a number of tubular anti-resonance element preforms,
- (c) arranging the anti-resonance element preforms at desired positions of the inner side of the cladding tube wall to form a primary preform, which comprises a hollow core region and an inner sheath region,
- (d) further processing the primary preform to form a secondary preform from which the hollow-core fiber is drawn, wherein the further processing comprises an elongation and, optionally, a single or repeated performance of one or more of the following hot-forming processes:
  - (i) collapse,
  - (ii) collapse and simultaneous elongation,
  - (iii) collapse of additional sheath material,
  - (iv) collapse of additional sheath material and subsequent elongation,
  - (v) collapse of additional sheath material and simultaneous elongation, and
- (e) drawing the secondary preform to form the hollow-core fiber, The invention also relates to a method for producing a preform for an anti-resonant hollow-core fiber comprising a hollow core extending along a longitudinal axis of the fiber and a sheath region surrounding the hollow core, which sheath region comprises several anti-resonance elements, comprising the method steps of:
- (a) providing a cladding tube comprising an inner bore of the cladding tube and a longitudinal axis of the cladding tube, along which a cladding tube wall delimited by an inner side and an outer side extends,
- (b) providing a number of tubular anti-resonance element preforms,
- (c) arranging the anti-resonance element preforms at desired positions of the inner side of the cladding tube wall to form a primary preform, which comprises a hollow core region and an inner sheath region, and
- (d) further processing the primary preform to form a secondary preform for the hollow-core fiber, wherein the further processing comprises an elongation and optionally a single or repeated performance of one or more of the following hot-forming processes:
  - (i) collapse,
  - (ii) collapse and simultaneous elongation,
  - (iii) collapse of additional sheath material,
  - (iv) collapse of additional sheath material and subsequent elongation,
  - (v) collapse of additional sheath material and simultaneous elongation.

Conventional single-mode optical fibers made of solid material have a core region made of glass, which is surrounded by a sheath region made of glass with a lower refractive index. Light guidance is based thereby on total reflection between the core region and the sheath region. However, the interactions of the guided light with the solid material are associated with an increased latency in data transmission and relatively low damage thresholds with respect to high-energy radiation.

These disadvantages are prevented or reduced by "hollow-core fibers" in which the core comprises an evacuated cavity filled with gas or liquid. In hollow-core fibers, the interaction of the light with the glass is less than in solid-core fibers. The refractive index of the core is less than that of the sheath so that light guidance by total reflection is not possible and the light would normally escape from the core into the sheath. As a function of the physical mechanism of the light guidance, hollow-core fibers are divided into "photonic bandgap fibers" and "anti-resonance reflection fibers."

In the case of "photonic bandgap fibers," the hollow core region is surrounded by a sheath in which small hollow channels are arranged periodically. On the basis of semiconductor technology, the periodic structure of the hollow channels in the sheath brings about the effect referred to as the "photonic bandgap," according to which light of certain wavelength ranges scattered at the sheath structures can constructively interfere due to Bragg reflection in the central cavity and cannot propagate transversely in the sheath.

In the embodiment of the hollow-core fiber referred to as "anti-resonant hollow-core fiber" (ARHCF), the hollow core region is surrounded by an inner sheath region in which so-called "anti-resonant elements" (or "anti-resonance elements," "AREs" for short) are arranged. The walls of the anti-resonance elements evenly distributed around the hollow core can act as Fabry-Perot cavities operated in anti-resonance, which reflect the incident light and guide it through the fiber core.

This fiber technology promises a low optical attenuation, a very broad transmission spectrum (even in the UV or IR wavelength ranges), and a low latency in data transmission.

Potential applications of the hollow-core fibers lie in the fields of data transmission, high-power beam guidance, for example for material processing, modal filtering, non-linear optics, in particular for super-continuum generation, from the ultraviolet to infrared wavelength range.

PRIOR ART

A disadvantage of anti-resonant hollow-core fibers is that higher-order modes are not necessarily suppressed so that they are often not exclusively single-mode over long transmission lengths and the quality of the output beam deteriorates.

In the paper by Francesco Poletti "Nested antiresonant nodeless hollow core fiber," Optics Express, vol. 22, no. 20 (2014), DOI: 10.1364/OE 22.023807, a fiber design is proposed, with which anti-resonance elements are not designed as a simple singular structural element but are composed of several nested structural elements. The nested anti-resonance elements are designed such that higher-order core modes, but not the fundamental core mode, are phase-matched to the sheath modes and are suppressed. As a result, the propagation of the fundamental core mode is always ensured, and the hollow-core fiber can be effectively single-mode over a limited wavelength range.

Effective mode suppression depends on the center wavelength of the transmitted light and on the structural parameters of the fiber design, such as the radius of the hollow core and the difference in the diameters of nested ring structures in the anti-resonance elements.

EP 3 136 143 A1 discloses an anti-resonant hollow-core fiber (referred to therein as "hollow-core fiber of non-bandgap type"), in which the core can conduct further modes in addition to the fundamental mode. For this purpose, it is surrounded by an inner sheath having "non-resonant elements," which provide a phase-matching of anti-resonant modes with the higher modes. The hollow-core fiber is produced according to what is known as a "stack-and-draw technique" by arranging the starting elements to form an axially parallel ensemble and fixing them to form a preform and then elongating the preform. In this case, a cladding tube with a hexagonal inner cross-section is used, and six so-called "ARE preforms" (anti-resonance element preforms) are fixed in the inner edges of the cladding tube. This preform is drawn in two stages to form a hollow-core fiber.

WO 2018/169487 A1 discloses a method for producing a preform for anti-resonant hollow-core fibers, in which a first sheath region comprises a plurality of rods and a second sheath region comprises a plurality of tubes surrounded by a cladding tube. Rods, tubes, and cladding tube are joined to form a preform by means of the "stack and draw" technique. Before the preform is elongated, the preform end is sealed, which is done by applying a sealing compound. For example, a UV adhesive is used as the sealing compound.

TECHNICAL OBJECT

Anti-resonant hollow-core fibers, and in particular those with nested structural elements, have complex internal geometries, which makes it difficult for them to be produced exactly and reproducibly. This applies all the more because, if the resonance or anti-resonance conditions are to be maintained, even small variations in dimensions in the order of magnitude of the operating wavelength of the light to be guided cannot be tolerated. Deviations from the desired geometry can be caused by the configuration of the fiber preform, and they can also occur through undesired deformations that are not true to scale in the fiber-drawing process.

In the known "stack and draw" technique, many elements are to be joined together with positional accuracy. For example, in order to produce the hollow-core fiber known from the aforementioned paper in the "NANF" design, six anti-resonance element preforms, each consisting of an anti-resonance element outer tube (ARE outer tube, for short) and an anti-resonance element inner tube welded on one side to the inner sheath surface of the ARE outer tube (ARE inner tube, for short) must be attached to the inner side of a cladding tube.

In order to achieve low attenuation values and broad transmission ranges, the azimuthal position of the anti-resonance elements within the cladding tube is also important in addition to a uniform wall thickness of the walls of the anti-resonance elements. This cannot be easily achieved with the "stack and draw" technique. The object of the invention is to specify a method for the cost-effective production of an anti-resonant hollow-core fiber that avoids the limitations of conventional production methods.

In particular, it is the object of the invention to provide a method for producing an anti-resonant hollow-core fiber and a preform for anti-resonant hollow-core fibers, with which a high precision of the structural elements and an exact positioning of the anti-resonance elements in the fiber can be reproducibly achieved in a sufficiently stable and reproducible manner.

Moreover, disadvantages of the classic "stack and draw" technique, with which the required structural accuracies, in particular a uniform wall thickness of the anti-resonance elements and exact positioning at predetermined azimuthal positions, is not easy to achieve, are to be avoided if at all possible.

SUMMARY OF THE INVENTION

With regard to the method for producing the anti-resonant hollow-core fiber, this object is achieved according to the invention starting from a method of the genus mentioned at the outset in that, after elongation in accordance with method step (d), at least a portion of the former tubular anti-resonance element preforms of the primary preform has an oval outer cross-sectional shape, with a longest cross-sectional axis $A_L$ and a shortest cross-sectional axis $A_K$, wherein the axis length ratio $A_L/A_K$ is in the range between 1.01 and 1.27, and wherein the shortest cross-sectional axis $A_K$ extends in the radial direction when viewed from the longitudinal axis of the cladding tube.

The starting point for producing the anti-resonant hollow-core fiber is a preform, which is also referred to herein as a "primary preform." Usually, the production of the primary preform comprises the installation and the connecting of anti-resonance element preforms to a cladding tube. The primary preform can be elongated to form the hollow-core fiber; however, as a rule, the primary preform is further processed to produce therefrom a preform referred to herein as a "secondary preform." Optionally, the hollow-core fiber is produced by elongating the secondary preform. Alternatively, the primary preform or the secondary preform are surrounded by one or more overlay cylinders to form a coaxial ensemble of components, and the coaxial ensemble is elongated directly to form the hollow-core fiber. The general term "preform" is understood here to mean that component or that coaxial ensemble of components from which the hollow-core fiber is ultimately drawn.

The addition of sheath material is accomplished, for example, by collapsing an overlay cylinder onto the primary preform or onto the secondary preform. The coaxial arrangement of preform and overlay cylinder is elongated or is not elongated when the overlay cylinder is collapsed. The anti-resonance element preforms here are changed in their shape or arrangement, or they are not changed in their shape or arrangement.

The production of the secondary preform comprises a number of method steps, with which starting elements of the hollow-core fiber are produced and positioned in relation to one another, and at least one hot-forming step. Each of the starting elements and has a certain deviation from its desired geometry, and each step of positioning and forming inevitably leads to geometry deviations that add up into an absolute geometry error in the finished preform. In particular, the hot forming of glass can lead to an undesired and non-reproducible deformation when there are even minimal deviations from an ideal, generally cylindrically symmetrical temperature profile of the heating zone. Such deformations can also be based on pressure and temperature conditions during elongation or during the fiber-drawing process, which are difficult to evade or avoid.

The method according to the invention aims at compensating for the deforming effect of such pressure and temperature conditions during elongation and during the fiber-drawing process.

For this purpose, it is provided for the elongation of the primary preform to be conducted such that, after completion of the elongation step, at least a portion of the former tubular anti-resonance element preforms of the primary preform, which are round in cross-section, has an oval outer cross-sectional shape.

Additional or no additional sheath material is applied during elongation of the primary preform. The result of the elongation step is a secondary preform or the result is a different semi-finished product, which may require further processing to form the secondary preform.

It has proven to be advantageous if most, preferably all, of the originally round structural elements of the former primary preform are geometrically changed during the elongation process such that they have a non-round, oval and ideally elliptical cross-sectional shape after the elongation process. This is because an additional geometric change occurs in the subsequent fiber-drawing process, as a result of which cavities having an oval radial cross-section are formed into cavities having a round radial cross-section.

It has been found that a degree of ovality of the cross-sectional shape of the elongated structural elements that is advantageous for this compensation can be described by the lengths of their longest and shortest axes (in cross-section). The ratio of the cross-sectional axis $A_L$ longest in cross-section and of the cross-sectional axis $A_K$ shortest in the cross-section is in the range between 1.01 and 1.27. What is important is the orientation of the ovals on the inner sheath surface of the former cladding tube: namely such that the shortest cross-sectional axis $A_K$ runs in the radial direction and the longest cross-sectional axis $A_L$ runs tangentially to the former inner sheath surface.

The anti-resonance element preforms may be composed of one structural element, such as a simple tube element, or of several structural elements. In the case of several structural elements, they are for example nested and in the simplest case form an ARE outer tube into which an ARE inner tube is inserted.

In a particularly preferred procedure relating to anti-resonance element preforms made of a simple tubular structural element, the tube elements have an oval, preferably elliptical, outer cross-sectional shape with the axis length ratio $A_L/A_K$ in the range between 1.07 and 1.27.

A further particularly preferred procedure relates to anti-resonance element preforms, which consist of several nested structural elements and comprise at least one ARE outer tube and an ARE inner tube running in the ARE outer tube and in parallel to the longitudinal axis of the ARE outer tube.

In such anti-resonance element preforms, the ARE inner tube is fixed to the inner side of the ARE outer tube wall. If the contact region between the ARE inner tube and the ARE outer tube is too small, separation and decentration of the ARE inner tube within the ARE outer tube may occur, due to surface tension in a hot-forming process as well. In order to counteract this, it has proven to be advantageous if the ARE outer tubes have an oval, preferably elliptical, outer cross-sectional shape with the axis length ratio $A_L/A_K$ in the range between 1.07 and 1.27, and the ARE inner tubes have an oval, preferably elliptical, outer cross-sectional shape with the axis length ratio $A_L/A_K$ in the range between 1.01 and 1.05.

The comparatively large ovality of the ARE outer tubes causes an enlargement of the contact region with the inner capillaries.

Prior to elongation, the primary preform preferably has an outer diameter in the range from 20 to 70 mm, particularly preferably in the range from 30 to 70 mm.

For the larger the diameter, the slower the feeding speed during elongation and the longer the duration that each axial section of the preform is exposed to the high temperature of the heating zone. However, at too slow a feeding speed during elongation, the structural elements of the anti-resonance element preforms deform. Therefore, the diameter of the primary preform is preferably at most 70 mm. And the diameter of the primary preform is preferably at least 20 mm, particularly preferably at least 30 mm. This is because it has been found with smaller diameters that the thermal inertia of the preform is too low to compensate for any temperature fluctuations in the heating zone.

In a preferred procedure, during elongation, the primary preform is continuously supplied to a heating zone at a feed rate, softened zone by zone in the heating zone, and removed from the heating zone at a removal rate.

If the feed rate is too high, temperature gradients can occur in the primary preform, which can result in the anti-resonance element preforms distributed therein at different radial positions exhibiting different elongation behavior. A feed rate that is too low can lead to undesired deformations of the anti-resonance element preforms. A suitable compromise has proven to be setting the feed rate so as to result in a throughput of at least 0.8 g/min, preferably a throughput in the range of 0.8 g/min to 85 g/min, and particularly preferably a throughput in the range of 3.3 g/min to 85 g/min, and an average dwell time in the heating zone of less than 25 min, preferably an average dwell time in the range of 5 to 25 min.

The temperature of the heating zone during the hot-forming process should be as constant as possible. In the hot-forming process in accordance with method step (d), a temperature-controlled heating element is therefore advantageously used, the desired temperature of which is kept with an accuracy of +/−0.1° C.

Temperature fluctuations in the hot-forming process can thereby be limited to less than +/−0.5° C.

In order to reduce absolute geometry errors, a large draw-down ratio during elongation is desired. On the other hand, a large draw-down ratio is associated with correspondingly large forming processes and material movements, which can easily lead to undesired deformations in the delicate structural elements of the anti-resonance element preforms.

As a suitable compromise, it has proven to be advantageous if the draw-down ratio during elongation is set to a value in the range of 1.05 to 10, preferably to a value in the range of 1.05 to 5.

In a preferred method variant, the arrangement of the anti-resonance element preforms and/or the elongation of the primary preform and/or the drawing of the hollow-core fiber comprises a fixing measure and/or a sealing measure using a sealing or bonding compound containing amorphous $SiO_2$ particles.

The sealing or bonding compound used for sealing or fixing contains amorphous $SiO_2$ particles, which are held, for example, in a dispersion liquid. This compound is applied between the surfaces to be bonded or sealed and is generally pasty during use. During drying at low temperature, the dispersion liquid is partially or completely removed and the compound solidified. The sealing or bonding compound, and in particular the solidified $SiO_2$-containing sealing or bonding compound obtained after drying, satisfies the requirements for fixing and compacting. The temperature required for drying is below 300° C., which facilitates compliance with the dimensional stability of the preform and avoids thermal impairments. Heating to higher temperatures around 800° C., for example during elongation of the preform to form the hollow-core fiber, results in further thermal solidification of the sealing or bonding compound, which is also suitable for forming opaque or transparent glass. This is done by sintering or vitrifying, wherein sintering to form opaque glass requires comparatively lower temperatures and/or short heating durations than vitrifying to complete transparency. The sealing or bonding compound can thus be completely compacted by heating and vitrified by heating in the hot-forming process.

In the hot-forming process, the sealing or bonding compound does not decompose and releases few impurities. It is thus characterized by thermal stability and purity in the hot-forming process and avoids deformations resulting from different thermal coefficients of expansion.

The sealing and bonding compound may also advantageously be used to seal open ends of the anti-resonance element preforms and/or individual structural elements of the anti-resonance element preforms and/or any annular gap between tube elements when the primary preform is elongated and/or when the hollow-core fiber is drawn.

In this way, the individual components of the primary preform and/or secondary preform may be subjected to different internal pressures during elongation or during the fiber-drawing process.

The accuracy of the positioning of the preforms on the inner sheath surface of the cladding tube is further improved by the inner side of the cladding tube and/or the outer side of the cladding tube and/or the inner side of the ARE outer tube and/or the outer side of the ARE outer tube being produced by machining, in particular by drilling, milling, grinding, honing, and/or polishing.

In comparison to other known forming techniques, said machining techniques provide more precise and more delicate structures by using heat and pressure, and they avoid contamination of surfaces by molding tools, such as nozzles, presses, or fusion molds.

The machining preferably also comprises a structuring of the inner side of the cladding tube in the region of desired positions of the anti-resonance element preforms by providing it with a longitudinal structure extending in the direction of the longitudinal axis of the cladding tube. This longitudinal structure comprises, for example, longitudinal slots and/or longitudinal grooves in the inner wall of the cladding tube, which run in parallel to the longitudinal axis of the cladding tube and which are preferably produced by drilling, sawing, milling, cutting, or grinding.

The longitudinal structure extending in the direction of the longitudinal axis of the cladding tube serves as a positioning aid for the anti-resonance element preforms. It makes it easier for the anti-resonance element preforms to assume predetermined defined positions on the inner side of the cladding tube.

The accuracy of the positioning of the preforms on the inner sheath surface of the cladding tube is improved if the upper face ends of the structural elements are positioned at the desired position by means of a positioning template.

The positioning template has, for example, a shaft projecting into the inner bore of the cladding tube, which shaft is provided with holding elements in the form of several holding arms pointing radially outward.

The structurally predetermined star-shaped arrangement of the holding elements facilitates the exact positioning of the anti-resonance element preforms at the respective desired positions and their fixing, for example by means of the sealing or bonding compound explained above. In this case, the positioning template is preferably used exclusively in the region of the end faces of the cladding tube, preferably in the region of both cladding tube end faces.

A procedure has also proven effective in which, when the primary preform is elongated in accordance with method step (d) and/or when the hollow-core fiber is drawn in accordance with method step (e), several components of the preform made of quartz glass are heated together and softened, wherein the quartz glass of at least some of the preform components contains at least one dopant that lowers the viscosity of quartz glass.

Components of the primary preform include the cladding tube and the anti-resonance element preforms arranged therein. The secondary preform contains additional sheath material that is provided, for example, in the form of one or more overlay cylinders and collapses onto the primary preform.

Dopants used to lower the viscosity of quartz glass are preferably fluorine, chlorine, and/or hydroxyl groups.

Doping makes it possible to adapt the thermal expansion coefficients of adjacent preform components in order to avoid or reduce stresses. It can also be used to reduce the thermal stability of a component in favor of the stability of an adjacent component.

For example, it has proven to be advantageous if, at a measured temperature of 1250° C., the quartz glass of the cladding tube has a viscosity at least 0.5 dPa·s higher, preferably a viscosity at least 0.6 dPa·s higher, than the quartz glass of additionally applied sheath material (if the viscosity is given as a logarithmic value in dPa·s).

In particular with regard to a low optical attenuation and a large optical transmission bandwidth of the hollow-core fiber, it has proven to be particularly advantageous for the anti-resonance elements to be arranged around the hollow core with an odd-numbered symmetry.

In a preferred procedure, the accuracy of the positioning of the preforms in the cladding tube is further improved in that tubular structural elements are provided, at least a portion of which has a wall thickness in the range of 0.2 and 2 mm, preferably a wall thickness in the range of 0.25 and 1 mm, and wherein a cladding tube with an outer diameter in the range of 90 and 250 mm, and preferably with an outer diameter in the range of 120 to 200 mm, is provided. These components each have a length of at least 1 m. They are relatively high-volume structural elements for forming anti-resonance elements. This simplifies handling. In addition, in the case of a vertical arrangement of the cladding tube and the structural elements, the gravitational force supports the parallelity and vertical alignment of the longitudinal axes of the structural elements when the structural elements are each positioned and fixed at their upper face end at the desired position; for example and preferably using the sealing or bonding compound explained in more detail above, and additionally or alternatively thereto by means of the positioning template explained in more detail above.

With regard to producing the preform for the hollow-core fiber, the aforementioned technical object is achieved according to the invention starting from a method of the genus mentioned at the outset in that, after elongation in accordance with method step (d), at least a portion of the former tubular anti-resonance element preforms of the primary preform has an oval outer cross-sectional shape, with a longest cross-sectional axis $A_L$ and a shortest cross-sectional axis $A_K$, wherein the axis length ratio $A_L/A_K$ is in the range between 1.01 and 1.27, and wherein the shortest cross-sectional axis $A_K$ extends in the radial direction when viewed from the longitudinal axis of the cladding tube.

Additional or no additional sheath material is applied during elongation of the primary preform. The result of the elongation step is a secondary preform or the result is a different semi-finished product in the form of the elongated primary preform, which may require further processing to form the secondary preform. In any case, the elongated primary preform is characterized in that at least a portion of the anti-resonance element preforms has an oval cross-sectional shape that is suitable, on the one hand, for counteracting deformation that can occur during elongation of the secondary preform to form the hollow-core fiber and which, on the other hand, can increase the contact regions between nested structural elements and thus contribute to a higher mechanical stability. This procedure enables a more precise production of the hollow-core fiber.

Measures for producing the preform are explained above in connection with the production of the hollow-core fiber, and these explanations are included herewith.

Definitions

Individual method steps and terms of the above description are additionally defined below. The definitions form part of the description of the invention. That which is expressed in the description is definitive in the event of a factual contradiction between one of the following definitions and the remaining description.

Anti-Resonance Elements

The anti-resonance elements may be simple or nested structural elements of the hollow-core fiber. They have at least two walls that, when viewed from the direction of the hollow core, have a negative curvature (convex) or do not have a curvature (planar, straight). They generally consist of a material that is transparent to the working light, for example glass, in particular doped or undoped $SiO_2$, a plastic, in particular a polymer, a composite material or crystalline material.

Anti-Resonance Element Preform/Anti-Resonance Element Precursor

What are referred to as anti-resonance element preforms are components or constituents of the preform that essentially become anti-resonance elements in the hollow-core fiber by simple elongation during the fiber-drawing process. Components or constituents of the preform that become anti-resonance element preforms only upon forming or that become anti-resonance elements directly are referred to as anti-resonance element precursors. The anti-resonance element preforms may be simple or nested components to which additional positioning aids can be fixed. They are originally present in the primary preform.

Nested anti-resonance element preforms form nested anti-resonance elements in the hollow-core fiber. They are composed of an outer tube and at least one further structural element that is arranged in the inner bore of the outer tube. The further structural element can be a further tube which abuts against the inner sheath surface of the outer tube. The outer tube is referred to as an "anti-resonance element outer tube" or an "ARE outer tube" for short, and the further tube is referred to as an "anti-resonance element inner tube" or an "ARE inner tube" for short, or also as a "nested ARE inner tube."

In the case of multi-nested anti-resonance element preforms, at least one further structural element, for example a third tube abutting against the inner sheath surface of the nested ARE inner tube, can be arranged in the inner bore of the nested ARE inner tube. Where there are multi-nested anti-resonance element preforms, in order to distinguish between the multiple tubes that are arranged within the ARE outer tube, a distinction can optionally be made between outer nested ARE inner tube" and "inner nested ARE inner tube."

The term "cross-section" in conjunction with cylindrical anti-resonance element preforms and their cylindrical structural elements always refers to the cross-section perpendicular to the respective longitudinal axis of the cylinder, namely, unless otherwise indicated, the cross-section of the outer contour in tubular components (not the cross-section of the inner contour).

Further processing of the primary preform, in particular by hot-forming steps, can result in intermediate products, in which the original anti-resonance element preforms are present in a shape that has been modified in comparison to the original shape. The modified shape is also referred to herein as an anti-resonance element preform or as an anti-resonance element precursor.

Preform/Primary Preform/Secondary Preform/Core Preform (Cane)

The preform is the component from which the anti-resonant hollow-core fiber is drawn. It is a primary preform or a secondary preform produced by further processing of the primary preform. The primary preform can be present as an ensemble consisting of at least one cladding tube and preforms or precursors for anti-resonance elements that are loosely accommodated or firmly fixed therein. The further processing of the primary preform to form a secondary preform from which the hollow-core fiber is drawn can comprise a single or repeated performance of one or more of the following hot-forming processes:

(i) elongation,
(ii) collapse,
(iii) collapse and simultaneous elongation,
(iv) collapse of additional sheath material,
(v) collapse of additional sheath material and subsequent elongation,
(vi) collapse of additional sheath material and simultaneous elongation.

A preform obtained by collapsing and/or elongating a primary preform is referred to in the literature as a core preform (cane). Typically, it is overlaid with additional sheath material before or during drawing of the hollow-core fiber.

Elongating/Collapsing

During elongation, the primary preform is lengthened. The lengthening can take place without simultaneous collapse. Elongation can take place true to scale so that, for example, the shape and arrangement of components or constituents of the primary preform is reflected in the elongated end product. During elongation, however, the primary preform can also be drawn not true to scale and its geometry can be modified.

During collapse, an inner bore is narrowed or annular gaps between tubular components are closed or narrowed. Collapse is generally accompanied by elongation.

Hollow Core/Inner Sheath Region/Outer Sheath Region

The ensemble comprising at least one cladding tube and therein loosely accommodated or firmly fixed preforms or precursors for anti-resonance elements is also referred to herein as "primary preform." The primary preform comprises the hollow core and a sheath region. This sheath region is also referred to as an "inner sheath region" if there is also an "outer sheath region" that has been produced, for example, by collapsing onto the ensemble, and if a distinction is to be made between said sheath regions. The terms "inner sheath region" and "outer sheath region" are also used for the corresponding regions in the hollow-core fiber or in intermediate products obtained by further processing of the primary preform.

The designation "inner side of the tube" is also used as a synonym for "inner sheath surface of the tube" and the designation "outer side of the tube" is also used as a synonym for "outer sheath surface of the tube." The term "inner bore" in conjunction with a tube does not mean that the inner bore has been produced by a drilling process.

Machining

This refers to separating mechanical manufacturing methods for the separating processing of a workpiece, in particular turning, cutting, drilling, sawing, milling, and grinding. This machining creates a longitudinal structure extending in the direction of the longitudinal axis of the cladding tube, which serves as a positioning aid for the anti-resonance element preforms. The longitudinal structure is accessible from the inner side of the cladding tube; it can also extend through the entire cladding tube wall to the outer side.

Particle Size and Particle Size Distribution

Particle size and particle size distribution of the $SiO_2$ particles are characterized using the $D_{50}$ values. These values are taken from particle size distribution curves showing the cumulative volume of $SiO_2$ particles as a function of the particle size. The particle size distributions are often characterized on the basis of the respective $D_{10}$, $D_{50}$, and $D_{90}$ values. In this case, the $D_{10}$ value characterizes the particle size that is not achieved by 10% of the cumulative volume of the $SiO_2$ particles, and accordingly, the $D_{50}$ value and the $D_{90}$ value characterize the particle sizes that are not achieved by 50% and by 90%, respectively, of the cumulative volume of the $SiO_2$ particles. The particle size distribution is determined by scattered light and laser diffraction spectroscopy according to ISO 13320.

EXEMPLARY EMBODIMENT

Figure 2:
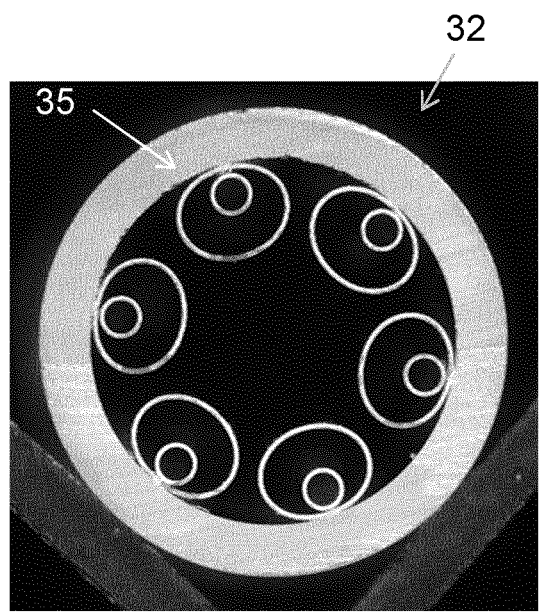
Figure 3:
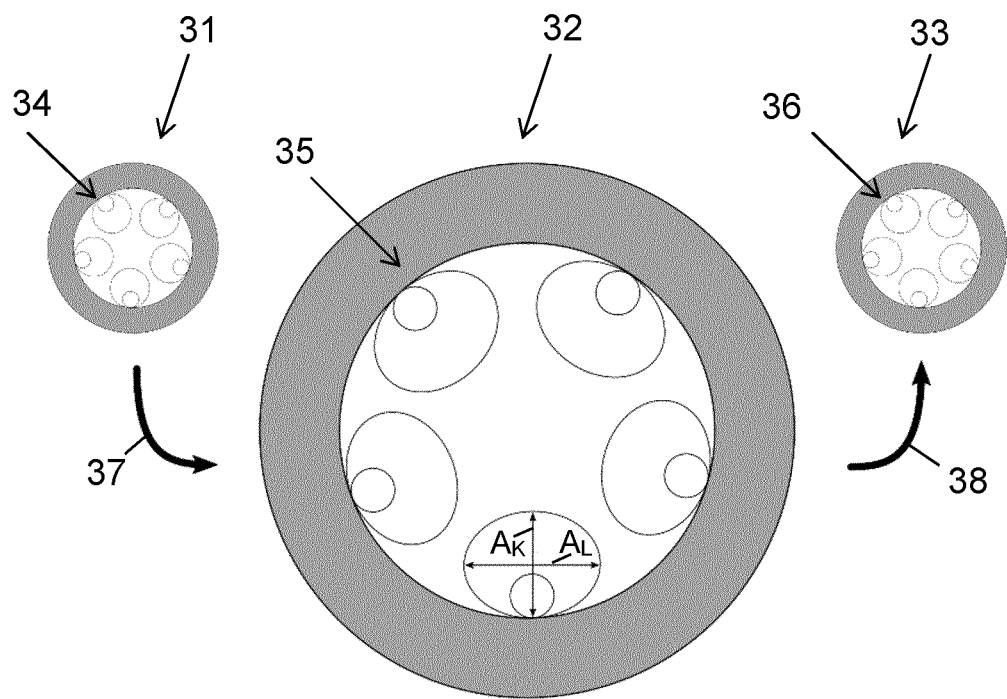
Figure 4:
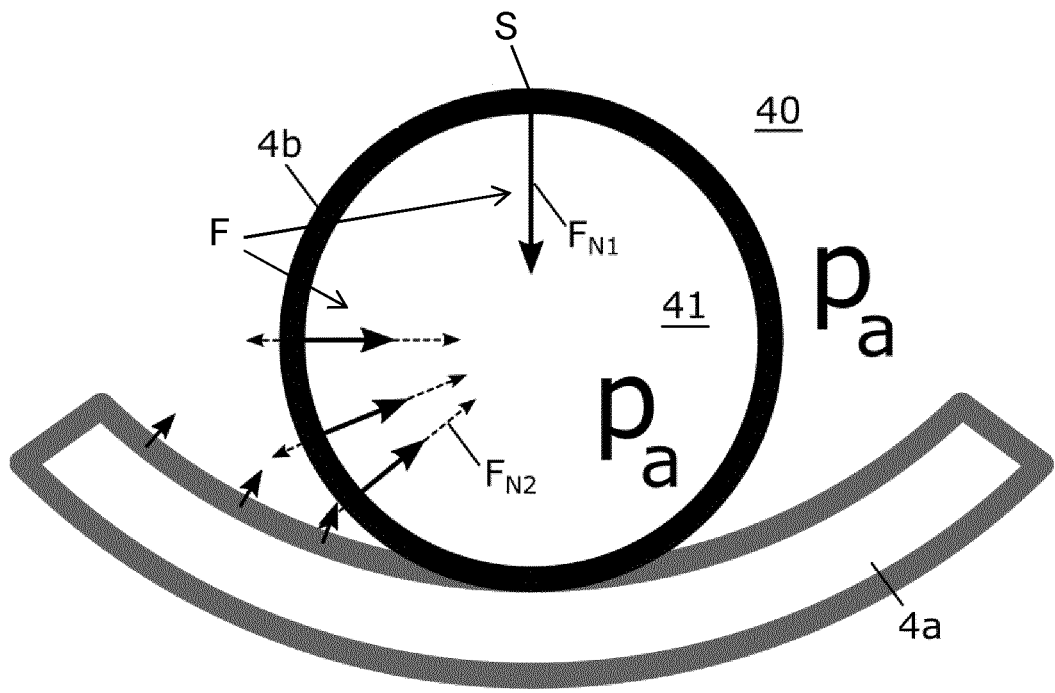

The invention is explained in more detail below with reference to an exemplary embodiment and a drawing. The following are shown in detail:

FIG. 1 a primary preform with a cladding tube and anti-resonance element preforms positioned and fixed therein for producing a secondary preform for a hollow-core fiber based on a view of the cross-section in a schematic representation, FIG. 2 a photograph of a secondary preform with pre-formed anti-resonance element preforms in a view of the cross-section, FIG. 3 processing stages from the primary preform to the anti-resonant hollow-core fiber, and FIG. 4 a sketch for explaining force conditions in the hot processing of nested anti-resonance elements.

In the production of the hollow-core fiber or the preform for the hollow-core fiber, a plurality of components is to be connected to one another. In addition, it can be helpful to seal existing gaps or channels of the preform when carrying out hot-forming processes. For bonding or sealing, a sealing or bonding compound based on $SiO_2$ and as disclosed in DE 10 2004 054 392 A1 is used. In this case, an aqueous slip containing amorphous $SiO_2$ particles having a particle size distribution characterized by a $D_{50}$ value of about 5 μm and by a $D_{90}$ value of about 23 μm is produced by wet milling quartz glass grain. Further amorphous $SiO_2$ grains with an average grain size of about 5 μm are mixed with the base slip. The slip used as a bonding compound has a solid content of 90%, which consists of at least 99.9 wt. % $SiO_2$.

FIG. 1 schematically shows a primary preform 3 with a cladding tube 1 having a cladding tube wall 2, to the inner sheath surface of which are fixed, at a uniform distance, anti-resonance element preforms 4 at previously defined azimuthal positions; in the exemplary embodiment, there are six preforms 4; in another preferred embodiment (not shown), there is an odd number of preforms.

The cladding tube 1 consists of quartz glass and has a length of 1000 mm, an outer diameter of 27 mm and an inner diameter of 20 mm. The anti-resonance element preforms 4 are present as an ensemble of nested structural elements consisting of an ARE outer tube 4a and an ARE inner tube 4b. The ARE outer tube 4a has an outer diameter of 6.2 mm and the ARE inner tube 4b has an outer diameter of 2.5 mm. The wall thicknesses of the two structural members (4a; 4b) are the same and are 0.3 mm. The lengths of ARE outer tube 4a and ARE inner tube 4b correspond to the cladding tube length.

The cladding tube 1 is produced in a vertical drawing process without a molding tool with a two-stage elongation process. In the first stage, a hollow starting cylinder made of glass is machined for setting the final dimensions of the hollow starting cylinder. Per the final dimension, the outer diameter is 90 mm and the diameter ratio of outer and inner diameters is 2.5. In a first elongation process, the starting cylinder with a vertically oriented longitudinal axis is continuously supplied to a heating zone having a heating zone length of 200 mm, softened in regions therein, and an intermediate cylinder is withdrawn from the softened region. In a second elongation process, the intermediate cylinder with a vertically oriented longitudinal axis is continuously supplied to a different heating zone having a heating zone length of 100 mm, softened in regions therein, and a tube section is withdrawn from the softened region. The cladding tube is obtained from the tube section by cutting it to length.

The anti-resonance element preforms 4 are fixed to the inner side of the cladding tube 1 by means of the bonding compound 5 based on $SiO_2$.

The bonding compound 5 is applied locally to the inner sheath surface of the cladding tube in the region of the face ends, and the anti-resonance element preforms are placed thereon using a positioning template with a structurally predetermined star-shaped arrangement of holding arms for the individual anti-resonance element preforms 4. In this case, the positioning template is limited to the region around the two face ends of the cladding tube.

This method creates a precise and reproducible connection between the cladding tube 1 and the anti-resonance element preforms 4. Solidification of the bonding compound 5 at a low temperature below 300° C. is sufficient for fixing so that an intense heating of the surrounding regions and thus a deformation of the anti-resonance element preforms 4 is avoided.

The primary preform 3 is overlaid with an overlay cylinder made of quartz glass, wherein the overlay cylinder collapses onto the cladding tube 1, and at the same time, the tube ensemble is elongated to form a secondary preform. The overlay cylinder has an outer diameter of 63.4 mm and a wall thickness of 17 mm.

In the collapse and elongation process, the coaxial arrangement of the cladding tube 1 and of the overlay cylinder with a vertically oriented longitudinal axis is supplied from below to a temperature-controlled heating zone and softens therein zone by zone starting with the upper end of the arrangement.

The heating zone is kept at a desired temperature of 1600° C. with a control accuracy of +1-0.1° C. Temperature fluctuations in the hot-forming process can thereby be limited to less than +1-0.5° C.

In the collapse and elongation step, an oval outer cross-sectional shape is impressed on the former tubular anti-resonance element preforms 4 of the primary preform 3 by generating and maintaining the same internal pressure in the hollow core region and in the tubular anti-resonance element preforms 4. FIG. 4 outlines the force conditions occurring in this case. During elongation, ambient pressure $p_a$ prevails both in the hollow core region 40 and in the inner bore of the ARE inner tube 4b. With an overpressure of 2.36 mbar in the cavity of the ARE inner tube 4b (in comparison to the pressure outside it), the ARE inner tube 4a would be stable during elongation. Without the internal pressure, forces act as indicated by the arrows F. The ratio of the normal force $F_{N1}$ at the upper apex "S" to the resulting normal force $F_{N2}$ on the side of the ARE inner tube wall is between 1.07 and 1.27 ($1.07<F_{N1}/F_{N2}<1.27$), As a result of this force ratio, the ARE inner tube 4b becomes oval and approximately elliptical during elongation, wherein the long axis of the ellipse runs tangentially to the wall of the ARE outer tube 4a and the shorter axis runs perpendicularly thereto.

Corresponding considerations for the ARE outer tube 4a result in an oval outer cross-sectional shape, which is characterized by an axis length ratio $A_L/A_K$ being between 1.07 and 1.27 ($1.07<A_L/A_K<1.27$).

The secondary preform formed in this way during the collapse and elongation process has an outer diameter of approximately 50 mm and a sheath wall thickness of 16.6 mm composed of an outer sheath and an inner sheath. The photograph of FIG. 2 shows the secondary preform 32 thus produced with the deformed anti-resonance element preforms 35 and in particular the oval-shaped ARE outer tubes. The ARE inner tubes are also measurably deformed ovally but to such a small extent that the deformation is not visible in FIG. 2.

The secondary preform is elongated to form an anti-resonant hollow-core fiber. For this purpose, all structural elements of the former anti-resonance element preforms, i.e., ARE outer tube 4a and ARE inner tube 4b, are sealed with the aforementioned sealing or bonding compound. Here, the sealing compound is applied only to the end face of the anti-resonance element preforms that points upward during the fiber-drawing process.

The same end face is then connected to a holding tube made of quartz glass, which simultaneously serves as a gas connection. The holder is fixed to the overlay cylinder and to the cladding tube by means of the sealing or bonding compound 5. In the fiber-drawing process, the secondary preform with a vertically oriented longitudinal axis is supplied from above to a temperature-controlled heating zone and softens therein zone by zone starting at the lower end. The heating zone is kept at a desired temperature of approximately 2100° C. with a control accuracy of +/−0.1° C. Temperature fluctuations in the hot-forming process can thereby be limited to less than +/−0.5° C. At the same time, gas is supplied to the core region (hollow core) so that an internal pressure of 4 mbar is adjusted in the core region.

As a result of the fiber-drawing process conducted in this manner, the oval cross-sectional shape of the former structural elements of the anti-resonance element preforms becomes a round cross-sectional shape so that an anti-resonant hollow-core fiber with anti-resonance elements embedded therein, which have a round cross-sectional shape, is obtained.

FIG. 3 schematically shows the method stages of the process. As a result of an elongation and collapse process 37, the primary preform 31 with anti-resonance element preforms 34 having a round cross-section becomes a secondary preform 32 with elongated anti-resonance element preforms 35 having an oval cross-sectional shape (characterized by the short cross-sectional axis $A_K$ and the long cross-sectional axis $A_L$), which is elongated in a fiber-drawing process 38 to form an anti-resonant hollow-core fiber 33 containing anti-resonance elements 36 with a round cross-sectional shape.

The invention claimed is:

1. Method for producing an anti-resonant hollow-core fiber comprising a hollow core extending along a longitudinal axis of the fiber and an inner sheath region surrounding the hollow core, which sheath region comprises several anti-resonance elements, comprising the method steps of:
   (a) providing a cladding tube comprising an inner bore of the cladding tube and a longitudinal axis of the cladding tube, along which a cladding tube wall delimited by an inner side and an outer side extends,
   (b) providing a number of tubular anti-resonance element preforms,
   (c) arranging the anti-resonance element preforms at desired positions of the inner side of the cladding tube wall to form a primary preform, which comprises a hollow core region and an inner sheath region,
   (d) further processing of the primary preform to form a secondary preform from which the hollow-core fiber is drawn, wherein the further processing comprises an elongation and, optionally, a single or repeated performance of one or more of the following hot-forming processes:
   (i) collapse,
   (ii) collapse and simultaneous elongation,
   (iii) collapse of additional sheath material,
   (iv) collapse of additional sheath material and subsequent elongation,
   (v) collapse of additional sheath material and simultaneous elongation, and
   (e) drawing the secondary preform to form the hollow-core fiber,
   characterized in that, after elongation in accordance with method step (d), at least a portion of the former tubular anti-resonance element preforms of the primary preform has an oval outer cross-sectional shape, with a longest cross-sectional axis $A_L$ and a shortest cross-sectional axis $A_K$, wherein the axis length ratio $A_L/A_K$ is in the range between 1.01 and 1.27, and wherein the shortest cross-sectional axis $A_K$ extends in the radial direction when viewed from the longitudinal axis of the cladding tube.

2. Method according to claim 1, characterized in that at least a portion of the tubular anti-resonance element preforms is composed of several nested structural elements and comprises at least one ARE outer tube and an ARE inner tube running in the ARE outer tube and in parallel to the longitudinal axis of the ARE outer tube, wherein the ARE outer tube has an oval, preferably elliptical, outer cross-sectional shape with the axis length ratio $A_L/A_K$ in the range between 1.07 and 1.27, and the ARE inner tube has an oval, preferably elliptical, outer cross-sectional shape with the axis length ratio $A_L/A_K$ in the range between 1.01 and 1.05.

3. Method according to claim 1, characterized in that the primary preform has an outer diameter in the range of 20 to 70 mm.

4. Method according to claim 1, characterized in that, during elongation, the primary preform is continuously supplied to a heating zone at a feed rate, softened zone by zone in the heating zone, and removed from the heating zone at a removal rate, wherein the feed rate is set so as to result in a throughput of at least 0.8 g/m in, preferably a throughput in the range from 0.8 g/min to 85 g/min, and particularly preferably a throughput in the range of 3.3 g/min to 85 g/min, and an average dwell time in the heating zone of less than 25 min, preferably an average dwell time in the range of 5 to 25 min.

5. Method according to claim 1, characterized in that the draw-down ratio during elongation is set to a value in the range of 1.05 to 10, preferably 1.05 to 5.

6. Method according to claim 1, characterized in that a temperature-controlled heating zone is used for elongating the primary preform, the desired temperature of which is kept with an accuracy of +/−0.1° C.

7. Method according to claim 1, characterized in that the fixing of the anti-resonance element preforms takes place using a sealing or bonding compound containing amorphous $SiO_2$ particles.

8. Method according to claim 1, characterized in that open ends of the anti-resonance element preforms and/or individual structural elements of the anti-resonance element preforms and/or any annular gap between tube elements are sealed by means of a sealing or bonding compound when the primary preform is elongated.

9. Method according to claim 1, characterized in that the inner side of the cladding tube is provided with a longitudinal structure extending in the direction of the longitudinal axis of the cladding tube by machining in the region of the desired positions.

10. Method according to claim 1, characterized in that the anti-resonance element preforms are positioned at the desired position by means of a positioning template.

11. Method according to claim 10, characterized in that the positioning template is used in the region of a cladding tube end face, preferably in the region of both cladding tube end faces.

12. Method according to claim 1, characterized in that, when the primary preform is elongated in accordance with method step (d) and/or when the hollow-core fiber is drawn in accordance with method step (e), several components of the preform made of quartz glass are heated together and softened, wherein the quartz glass of at least some of the preform components contains at least one dopant that lowers the viscosity of quartz glass.

13. Method according to claim 12, characterized in that additional sheath material is collapsed in accordance with method step (d), and in that the quartz glass of the cladding tube at a measured temperature of 1250° C. has a viscosity at least 0.5 dPa·s higher, preferably a viscosity at least 0.6 dPa·s higher, than the quartz glass of the additionally applied sheath material (if the viscosity is given as a logarithmic value in dPa·).

14. Method according to claim 1, characterized in that the arrangement of the anti-resonance element preforms at desired positions of the inner side of the cladding tube wall and/or the drawing of the hollow-core fiber in accordance with method step (d) comprises a fixing measure and/or a sealing measure using a sealing or bonding compound containing amorphous $SiO_2$ particles.

15. Method for producing a preform for an anti-resonant hollow-core fiber comprising a hollow core extending along a longitudinal axis of the fiber and an inner sheath region surrounding the hollow core, which sheath region comprises several anti-resonance elements, comprising the method steps of:
  (a) providing a cladding tube comprising an inner bore of the cladding tube and a longitudinal axis of the cladding tube, along which a cladding tube wall delimited by an inner side and an outer side extends,
  (b) providing a number of tubular anti-resonance element preforms,
  (c) arranging the anti-resonance element preforms at desired positions of the inner side of the cladding tube wall to form a primary preform, which comprises a hollow core region and an inner sheath region,
  (d) further processing the primary preform to form a secondary preform for the hollow-core fiber, wherein the further processing comprises an elongation and optionally a single or repeated performance of one or more of the following hot-forming processes:
  (i) collapse,
  (ii) collapse and simultaneous elongation,
  (iii) collapse of additional sheath material,
  (iv) collapse of additional sheath material and subsequent elongation,
  (v) collapse of additional sheath material and simultaneous elongation, and
    characterized in that, after elongation in accordance with method step (d), at least a portion of the former tubular anti-resonance element preforms of the primary preform has an oval outer cross-sectional shape, with a longest cross-sectional axis $A_L$ and a shortest cross-sectional axis $A_K$, wherein the axis length ratio $A_L/A_K$ is in the range between 1.01 and 1.27, and wherein the shortest cross-sectional axis $A_K$ extends in the radial direction when viewed from the longitudinal axis of the cladding tube.

* * * * *